(12) United States Patent
Frederick

(10) Patent No.: US 7,217,181 B2
(45) Date of Patent: May 15, 2007

(54) CATFISH SKINNER AND METHOD

(75) Inventor: Kelly Frederick, Prarieville, LA (US)

(73) Assignee: Frederick Technology Firm, LLC, Prairieville, LA (US)

( * ) Notice: Subject to any disclaimer, the term of this patent is extended or adjusted under 35 U.S.C. 154(b) by 0 days.

(21) Appl. No.: 11/163,231

(22) Filed: Oct. 11, 2005

(65) Prior Publication Data

US 2007/0082597 A1    Apr. 12, 2007

(51) Int. Cl.
*A22B 1/00*   (2006.01)
(52) U.S. Cl. ..................................... 452/185
(58) Field of Classification Search ............... 43/21.2; 248/303, 304; 42/94; 211/85.4–85.9, 30, 211/33, 64, 168, 174; 224/913, 912
See application file for complete search history.

(56) References Cited

U.S. PATENT DOCUMENTS

| | | | | |
|---|---|---|---|---|
| 161,206 A * | 3/1875 | Comly | ........................ | 248/303 |
| 710,805 A * | 10/1902 | Riley | ........................ | 211/33 |
| 879,052 A * | 2/1908 | Jeranek | ........................ | 89/40.06 |
| 1,464,279 A * | 8/1923 | Hindley | ........................ | 248/125.1 |
| 1,627,652 A * | 5/1927 | Kornicker et al. | .......... | 248/158 |
| 1,754,998 A * | 4/1930 | Geartts | ........................ | 211/85.4 |
| 2,194,191 A * | 3/1940 | Wolf | ........................ | 211/96 |
| 2,650,717 A * | 9/1953 | Larson | ........................ | 211/196 |
| 3,416,673 A * | 12/1968 | Ballard | ........................ | 211/115 |
| 5,433,413 A * | 7/1995 | Adams | ........................ | 248/205.3 |
| 5,474,188 A * | 12/1995 | McArdle | ........................ | 211/85.4 |
| 6,250,597 B1 * | 6/2001 | Kuo | ........................ | 248/231.91 |
| 6,364,266 B1 * | 4/2002 | Garvin | ........................ | 248/303 |

* cited by examiner

*Primary Examiner*—Thomas Price
(74) *Attorney, Agent, or Firm*—Roy, Kiesel, Keegan & DeNicola; Neil J. Coig

(57) ABSTRACT

The invention is a method and apparatus for quicker, easier and more injury-free catfish skinning utilizing a wedging device to limit movement.

7 Claims, 5 Drawing Sheets

CATFISH SKINNER AND METHOD

BACKGROUND OF THE INVENTION

The present invention relates to a method and apparatus for skinning fish, particularly catfish, a common name applied to members of the fish families classified in the phylum Chordata, subphylum Vertebrata, class Osteichthyes, order Cypriniformes, suborder Nematognathi.

Catfish have scaleless skin, and as such, they are unique in the approach to obtaining the catfish meat, or product. In the traditional mode of skinning catfish, the live fish are attempted to be secured in position at or near the head so that the fish's skin may be removed. Cuts are made along the fish's neck, and the person performing the skinning must pull the skin off of the fish as it wriggles, attempting to escape. The only employed methods of securing the fish to prevent such escape are methods such as clamping the fish to a board, or forcing the fish's head on a nail secured to another stationary object. In the either of these methods, the fish must be handled twice as much to flip it from one side to the other to make cuts, and the latter does not permit re-placement of the fish, because the flesh will be unusable as a result of piercing the fish's head with an object such as a nail. Also known is a method of using a rounded hook to try and secure the head of a catfish. However, again in this instance, the fish is able to move a great deal about the length of the hook, making securing the fish difficult, as well as the difficulty in making accurate cuts on the wriggling fish.

This skinning proves to be challenging not only from the standpoint of the difficulties of working with a lubricious item such as a freshly caught fish, but catfish in particular are capable of stinging by using the barbels located along the periphery of their mouths, cutting by using sharp defensive spines in the shoulder and dorsal fins, as well as biting, since the fish possess both a large mouth and powerful jaws capable of inflicting harm on someone seeking to skin these fish. Being able to secure the fish thus becomes very important in this endeavor to prevent injury, as well as obtaining the maximum amount of meat from each fish, obtained by making an optimal skinning.

Obvious downsides to the current method of skinning exist, as are witnessed above. The consequence of these issues is increased injuries associated with the skinning, reduced productivity, and a poorly executed skin removal.

All of these aspects of the current mode of catfish skinning lead to an increased need for a revised method and apparatus for catfish skinning with minimized cost and complexity, all of which the present invention addresses.

The present invention of a skinning apparatus and method is thus a much-improved mode of handling this process, since it enables a person seeking to skin a catfish the ability to skin the fish while it remains fixed and does not require the positioning of the fish at all. The entire process can be accomplished without moving the fish from its initial placement on the invention.

OBJECTS OF THE INVENTION

One object of the invention is to provide a method for skinning catfish.

Another object of this invention is to provide an apparatus for skinning catfish.

Yet another object of this invention is to provide a method of catfish skinning with a reduced injury occurrence.

Still another object of this invention is to provide a quicker method of catfish skinning.

Other objects and advantages of this invention shall become apparent from the ensuing descriptions of the invention.

SUMMARY OF THE INVENTION

According to the present invention, a method and apparatus for quicker, easier and more injury-free catfish skinning utilizing a wedging device to limit movement is disclosed.

BRIEF DESCRIPTION OF THE DRAWINGS

The accompanying drawings illustrate an embodiment of this invention. However, it is to be understood that this embodiment is intended to be neither exhaustive, nor limiting of the invention. They are but examples of some of the forms in which the invention may be practiced.

DETAILED DESCRIPTION OF EXEMPLARY EMBODIMENTS

Without any intent to limit the scope of this invention, reference is made to the figures in describing the various embodiments of the invention. FIGS. 1–10 show various aspects of exemplary embodiments of the present invention.

Figure 1:
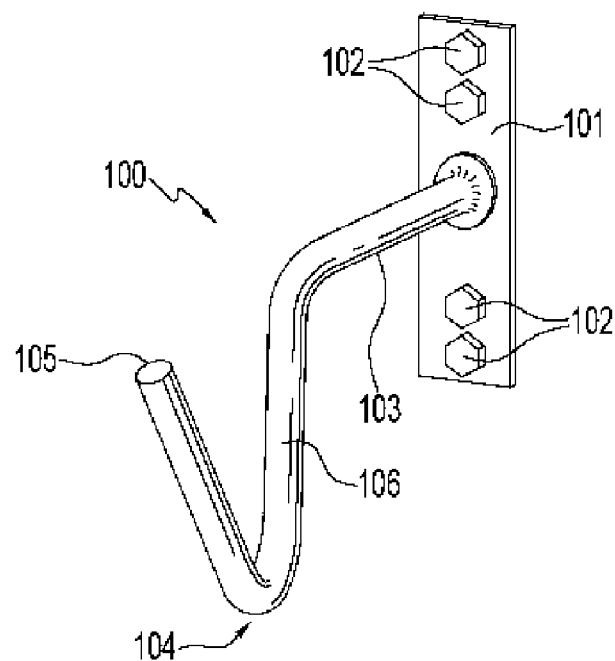
FIG. 1 is a perspective view of the catfish skinner.
Figure 2:
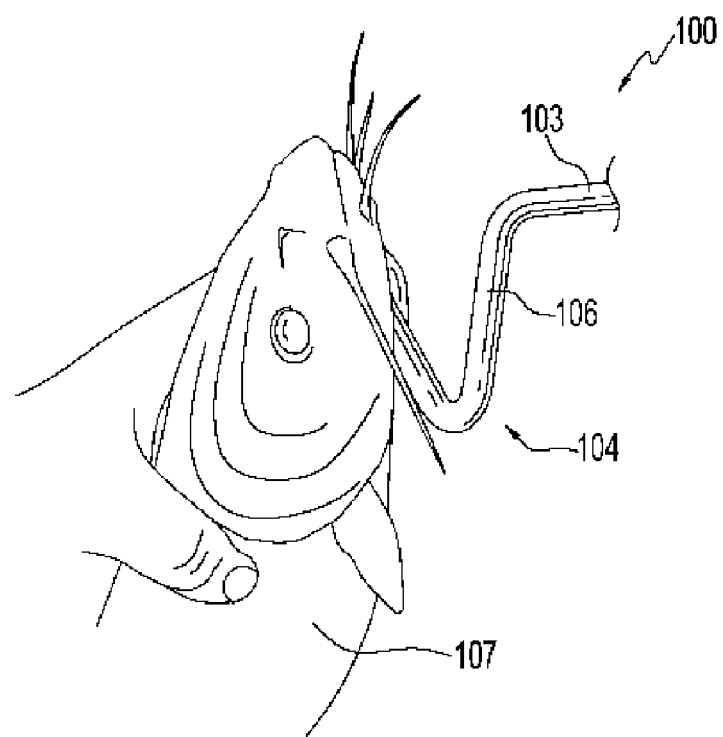
FIG. 2 is a perspective view of the first step of the catfish skinning method.

The present invention relates to an apparatus and method for catfish skinning. FIG. 1 depicts the catfish skinner 100 having mounting base 101 for mounting to a surface, such as a tree, pole, wall or other object using securing devices 102 such as bolts, screws or nails. Generally this object would be something that was perpendicular to the surface below the user's feet, however this is not required. From mounting base 101 extends main support 103, which is substantially perpendicular to the plane of mounting base 101, but need not be perfectly perpendicular. From main support 103 is extended in a downward direction first leg 106 of fish skinning wedging device 104. First leg 106 is again roughly perpendicular to main support 103, and thus roughly parallel to mounting base 101, but absolutely perpendicular mounting is not required. From first leg 106 is attached second leg 105 which is attached at an approximately 55 degree angle and facing generally upward. Effective range of this angle can be from approximately 10 degrees to approximately 70 degrees; however, a preferred embodiment would be approximately 55 degrees.

A portion or all of fish skinning wedging device 104 can also be barbed or textured to add additional gripping properties to catfish skinner 100 if desired. Multiple fish skinning wedging devices 104 can also be employed together for use for several users at once, or if other small game were desired to be hung between two of such fish skinning wedging devices 104. Another embodiment of the invention could involve a main support 103 which is pivotable about mounting base 101 so that the cuts made in the method discussed below can be made on one side only, instead of moving about fish skinning wedging device 104.

Figure 9:
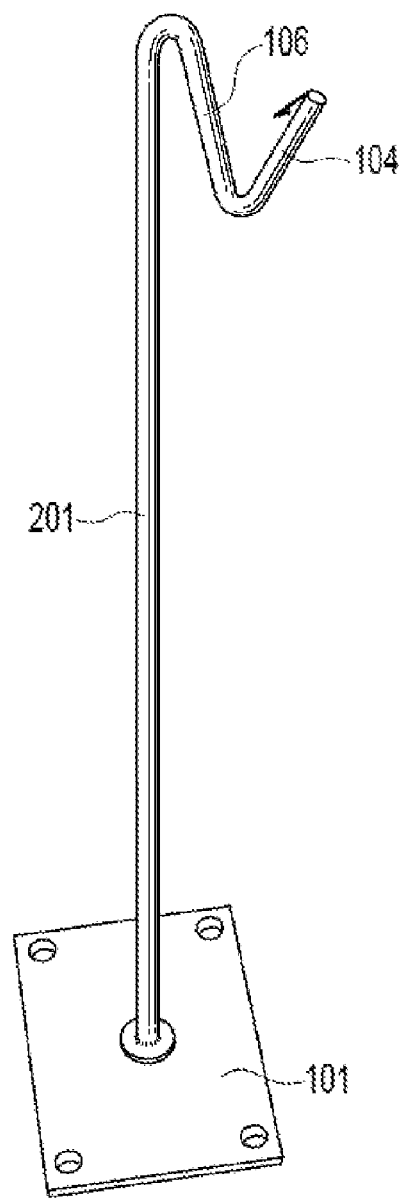
FIG. 9 is a perspective view of an alternate embodiment of the catfish skinning apparatus.
Figure 10:
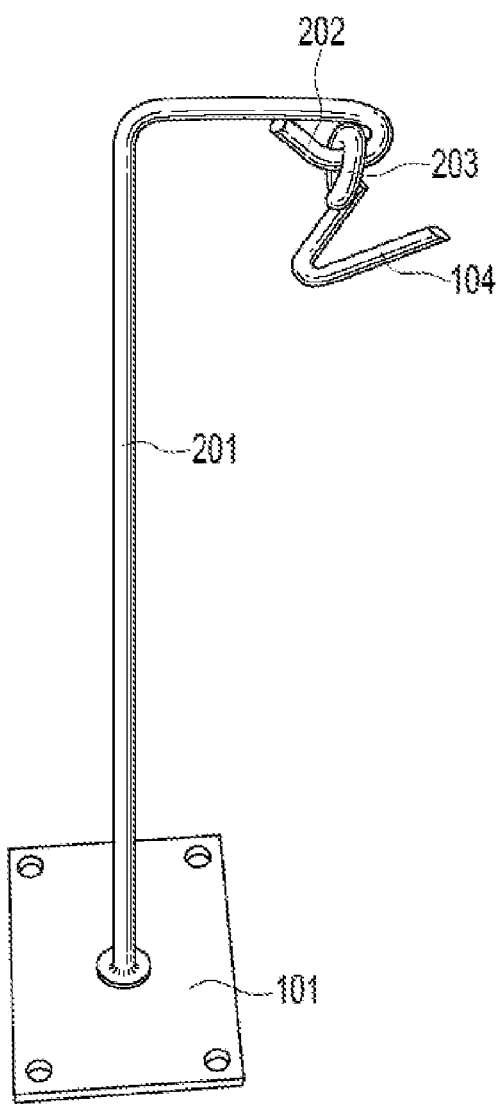
FIG. 10 is a perspective view of an alternate embodiment of the catfish skinning apparatus having a swivel attachment.

Two alternate embodiments are shown in FIGS. 9 and 10. In the first, elongated main support 201 is shown, which permits a convenient floor mount, or wall mount using mounting base 101. First leg 106 can be repositioned to keep fish skinning wedging devices 104 facing upward for a floor mount, or again substantially perpendicular for wall mounting.

In the second embodiment pictured in FIG. 10, a swivel variant of fish skinning wedging device 104 is pictured. In this embodiment, fish skinning wedging device 104 is mounted to permit movement about a limited axis, which may be preferable to some users who might want some limited mobility of the fish, for instances where access to both sides of the fish from the same position may be desired. This is accomplished a multitude of ways, but is simply pictured using a loop and eye relationship with loop 203 and eye 202 supporting fish skinning wedging device 104.

It should be noted that though catfish have been recited as the fish to be skinned herein, any suitable fish or organism having similar physical characteristics that could benefit from this apparatus or method should be construed as being able to employ and take advantage of the present invention. Such other species include dogfish, sharks, sturgeons and the like. The invention can be resized to fit the appropriate species as needed, so long as the proportions remain the same. It should be noted that this device need not apply to only sea creatures, but also has applicability for land animals as well, which may be easier harnessed in place by using such a wedging device 104 to keep the animal still.

Figure 3:
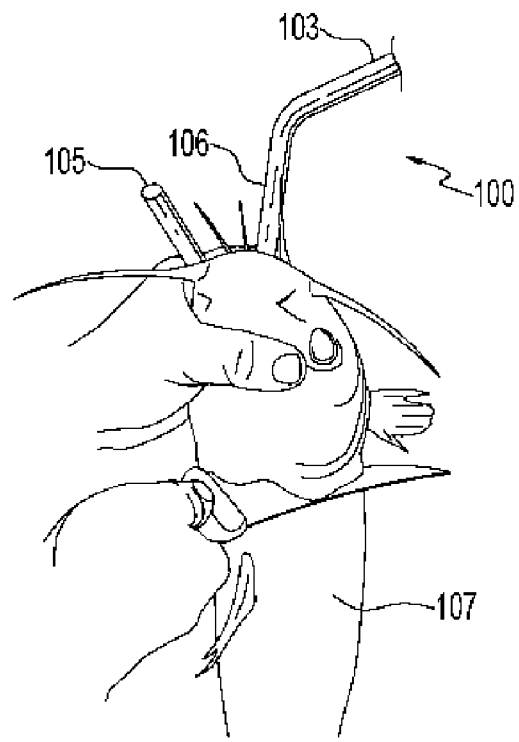
FIG. 3 is a perspective view of the second step of the catfish skinning method.
Figure 4:
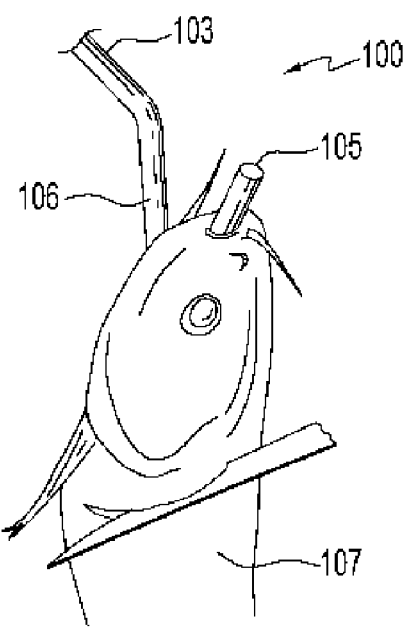
FIG. 4 is a perspective view of the third step of the catfish skinning method.
Figure 5:
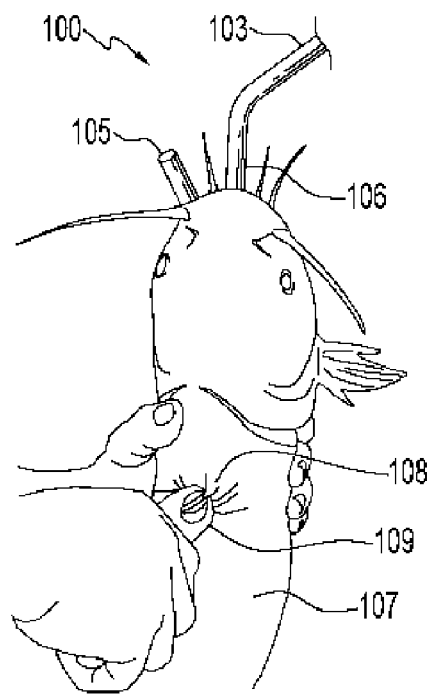
FIG. 5 is a perspective view of the fourth step of the catfish skinning method.
Figure 6:
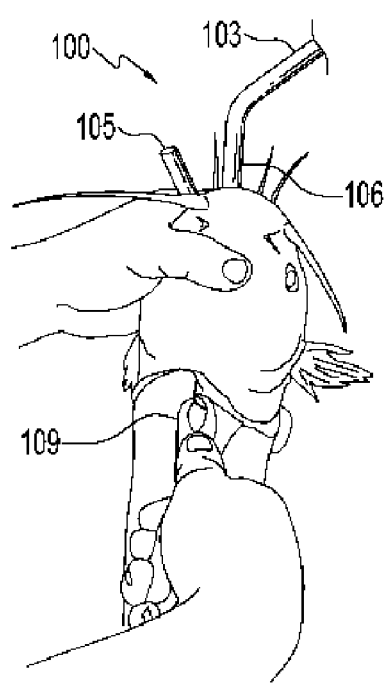
FIG. 6 is a perspective view of the fifth step of the catfish skinning method.
Figure 7:
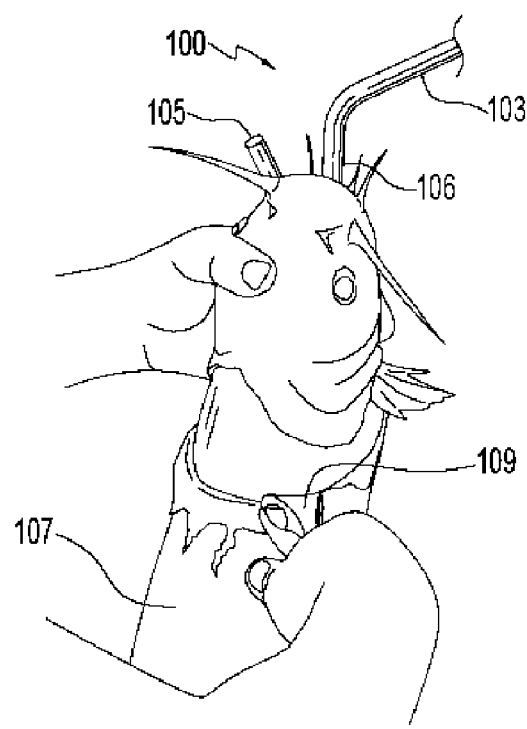
FIG. 7 is a perspective view of the sixth step of the catfish skinning method.
Figure 8:
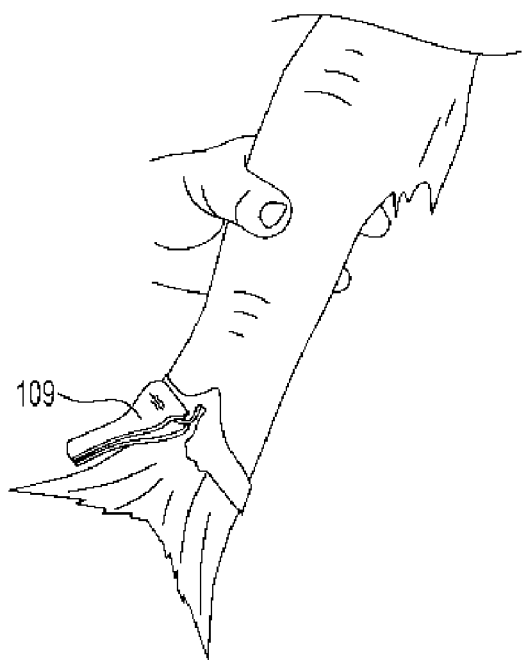
FIG. 8 is a perspective view of the seventh step of the catfish skinning method.

In operation, fish 107 is placed on catfish skinner 100 by feeding second leg 105 through the gill on the underside of the jaw of fish 107, and forced down second leg 105 until firmly in place at the joint of catfish skinner wedging device 104. In this way, fish 107 will be unable to wriggle free or otherwise escape. A user then need only make a cut around the base of the head of fish 107 as seen in FIGS. 3 and 4, remove dorsal fin 108 using pliers 109 or other similar device, and then using the same pliers 109 or other pulling device (a user's hands could also be used, but at a diminished effectiveness) simply pull down the skin of fish 107. Thus, a quicker, easier skinning has been performed.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. An apparatus for skinning fish comprising:
   a. a mounting base having at least three sides configured to attach to a stationary object via a plurality of securing devices along at least two of said sides of said mounting base;
   b. a main support operatively connected in a substantially perpendicular configuration to said mounting base;
   c. a first leg operatively connected to said main support and extending downward; and
   d. a second leg operatively attached to said first leg and which is configured at an angle between ten degrees and seventy degrees to said first leg and is angled generally upward, forming a fish skinning wedging device.

2. The apparatus for skinning fish of claim 1 wherein said angle is configured at approximately fifty-five degrees.

3. The apparatus for skinning fish of claim 1 wherein said fish skinning wedging device is textured.

4. An apparatus for skinning fish comprising:
   a. a mounting base configured to attach to a stationary object;
   b. a main support operatively connected in a substantially perpendicular configuration to said mounting base;
   c. a first leg operatively connected to said main support and extending downward; and
   d. a second leg operatively attached to said first leg and which is configured at an angle between ten degrees and seventy degrees to said first leg and is angled generally upward, forming a fish skinning wedging device and wherein said fish skinning wedging device is barbed.

5. The apparatus for skinning fish of claim 1 wherein said first leg is pivotably attached to said main support.

6. A method of skinning a fish using an apparatus comprising a mounting base configured to attach to a stationary object; a main support operatively connected in a substantially perpendicular configuration to said mounting base; a first leg operatively connected to said main support and extending downward; and a second leg operatively attached to said first leg and which is configured at an angle between ten degrees and seventy degrees to said first leg and is angled generally upward, forming a fish skinning wedging device, the method comprising:
   a. securing said fish on said fish skinning wedging device of said apparatus for skinning fish;
   b. utilizing a sharp object for cutting the skin of said fish around the base of the head of said fish;
   c. removing said fish's dorsal fin, if present;
   d. pulling off in a downward motion the skin of said fish, leaving the skinned fish remaining on said fish skinning wedging device.

7. An apparatus for skinning fish comprising:
   a. a mounting base configured to attach to a stationary object;
   b. a main support operatively connected in a substantially perpendicular configuration to said mounting base;
   c. a first leg operatively connected to said main support and extending downward and wherein said main support is pivotably attached to said mounting base; and
   d. a second leg operatively attached to said first leg and which is configured at an angle between ten degrees and seventy degrees to said first leg and is angled generally upward, forming a fish skinning wedging device that is both textured and barbed.

* * * * *